(12) United States Patent
Schweigert et al.

(10) Patent No.: US 7,117,923 B2
(45) Date of Patent: Oct. 10, 2006

(54) METHODS AND APPARATUS FOR FORMING A GOLF CLUB HOSEL

(75) Inventors: Bradley D. Schweigert, Anthem, AZ (US); Michael R. Nicolette, Scottsdale, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 10/650,164

(22) Filed: Aug. 28, 2003

(65) Prior Publication Data

US 2006/0175035 A1 Aug. 10, 2006

(51) Int. Cl.
*B22C 7/02* (2006.01)
*B22C 9/04* (2006.01)

(52) U.S. Cl. ........................................ 164/45; 164/516
(58) Field of Classification Search .................. 164/35, 164/45, 516–519
See application file for complete search history.

(56) References Cited

U.S. PATENT DOCUMENTS 5,407,344 A  4/1995  Rombalski, Jr. et al.
5,547,630 A  8/1996  Schmidt
6,406,654 B1  6/2002  Perez et al.

FOREIGN PATENT DOCUMENTS

GB  2345262  7/2000

*Primary Examiner*—Kuang Y. Lin
(74) *Attorney, Agent, or Firm*—Darrell F. Marquette

(57) ABSTRACT

A method of fabricating a golf club hosel includes the steps of: (1) providing a mold tool having a cavity corresponding to a hosel having a generally cylindrical boss portion coupled to a horizontal leg portion extending radially from the boss portion, wherein the horizontal leg portion has a width that is less than the outside diameter of the boss portion; (2) providing a mold tool insert slideably coupled to the mold tool along a sliding axis generally perpendicular to the horizontal leg portion; (3) sliding the mold tool insert to a first position such that the mold tool insert forms, within said cavity, a surface of the cylindrical portion and a surface of the horizontal leg portion; (4) filling the mold tool cavity with a material (e.g., a wax material); and (5) sliding the mold tool insert to a second position such that the mold tool insert disengages from the material in the mold tool cavity.

7 Claims, 4 Drawing Sheets

METHODS AND APPARATUS FOR FORMING A GOLF CLUB HOSEL

FIELD OF INVENTION

The present invention relates, generally, to golf club heads and, more particularly, to a method of forming a golf club hosel using a mold tool insert.

BACKGROUND OF THE INVENTION

A golfer's ability to properly address and hit a golf ball is a strong function of the various visual cues provided to the golfer by the club head. The shape of the golf club hosel, for example, and the way that the hosel interfaces with the club head body, are all important visual design features.

More particularly, with reference to FIG. 1, a golf club hosel 100 may generally include a cylindrical boss 102, a horizontal leg portion 104, and a vertical leg portion 106. Boss 102 is configured to accept a golf club shaft (not shown), and has a bottom end 108 that intersects horizontal leg portion 104. The width $W_1$ of vertical leg portion 106 is less than the outer diameter D of boss 102. As a result, horizontal leg portion 104 tapers from a width $W_2$ to a width $W_1$ as it extends out from base 108 of boss 108 to end 110, where it transitions to vertical leg portion 106.

FIG. 2 depicts hosel 100 as seen from the top, as a golfer might view the hosel during address. As shown, since horizontal arm 104 decreases in width from end 108 to end 110, the two sides 112 and 114 of horizontal arm 104 are necessarily non-parallel. The appearance of these non-parallel lines can disturb the golfer when he or she is attempting to achieve the correct address position.

It would be advantageous, then, to form a hosel such as that shown in FIGS. 3 and 4, where two sides 112 and 114 of horizontal arm 104 are substantially parallel. Currently known methods of hosel casting, however, are unable to form such shapes. More particularly, with momentary reference to FIG. 4, in order to manufacture boss 102 and horizontal leg 104, it is necessary to incorporate two mold halves that meet at a separation line that lies on or adjacent to hosel 100. Such a mold would be used, for example, when forming a wax replica in a metal mold tool in connection with a lost-wax process. The separation line is positioned with respect to the hosel such that the molded hosel is pulled or released from the mold at an angle substantially perpendicular to the separation line (i.e., along a pull direction 402). In such a case, and depending upon the position of the separation line, the leading edge near the base 108 of boss 102 (region 404 in FIG. 4) can interfere with removal of the finished molded part.

SUMMARY OF THE INVENTION

A method of fabricating a golf club hosel includes the steps of: (1) providing a mold tool having a cavity corresponding to a hosel having a generally cylindrical boss portion coupled to a horizontal leg portion extending radially from the boss portion, wherein the horizontal leg portion has a width that is less than the outside diameter of the boss portion; (2) providing a mold tool insert slideably coupled to the mold tool along a sliding axis generally perpendicular to the horizontal leg portion; (3) sliding the mold tool insert to a first position such that the mold tool insert forms, within said cavity, a surface of the cylindrical portion and a surface of the horizontal leg portion; (4) filling the mold tool cavity with a material (e.g., a wax material); and (5) sliding the mold tool insert to a second position such that the mold tool insert disengages from the material in the mold tool cavity.

BRIEF DESCRIPTION OF THE DRAWINGS

The subject invention will hereinafter be described in conjunction with the appended drawing figures, wherein like numerals denote like elements, and.

DETAILED DESCRIPTION

Figure 1:
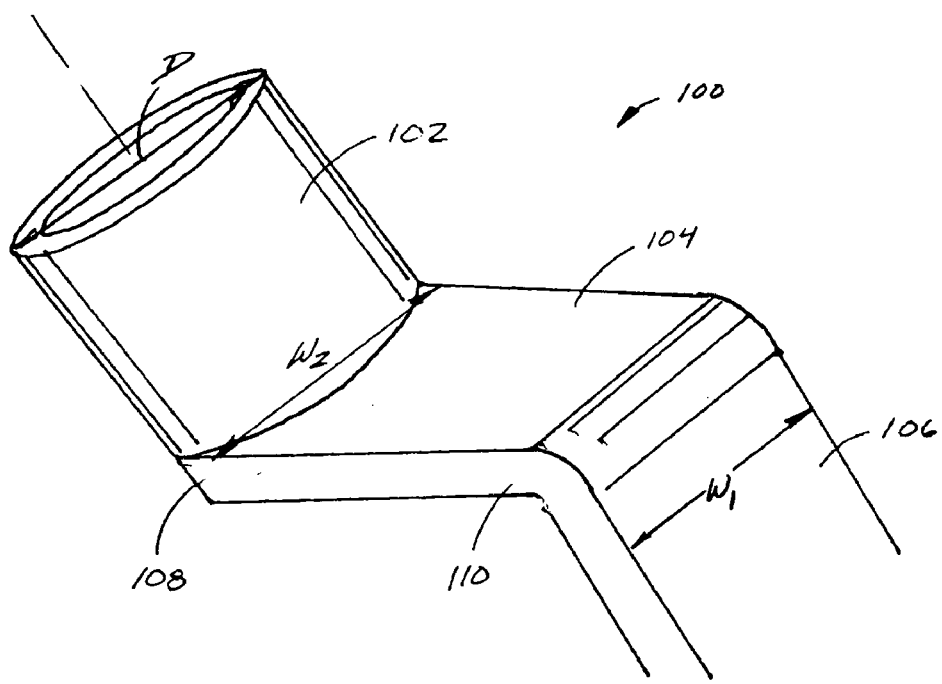
FIG. 1 is an isometric view of a prior art golf club hosel.
Figure 2:
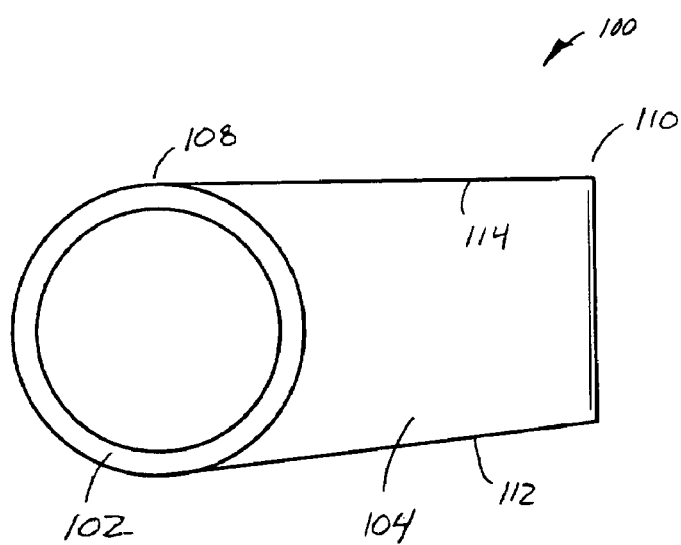
FIG. 2 is a top view of the hosel shown in FIG. 1.
Figure 3:
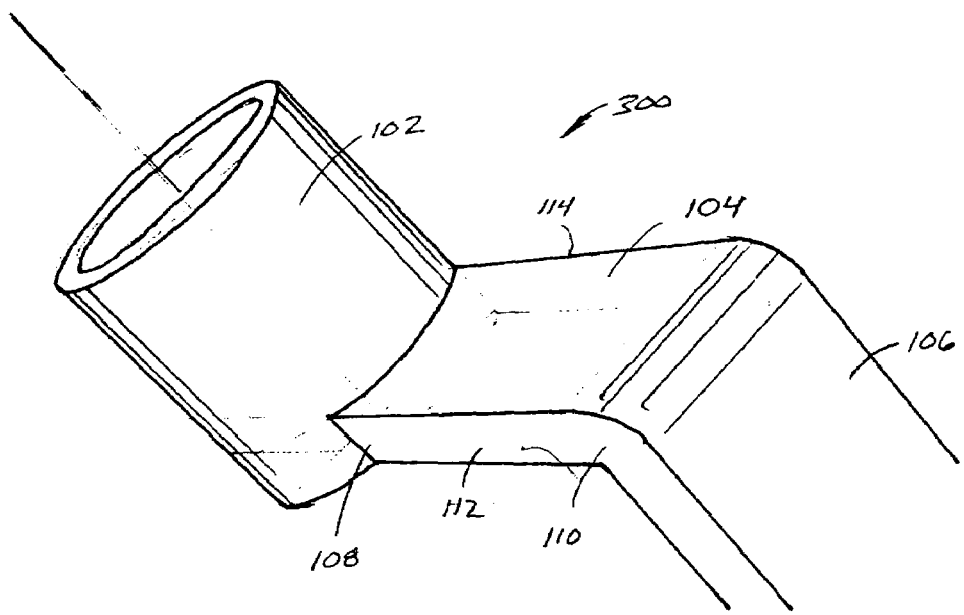
FIG. 3 is an isometric view of a golf club hosel in accordance with the present invention.
Figure 4:
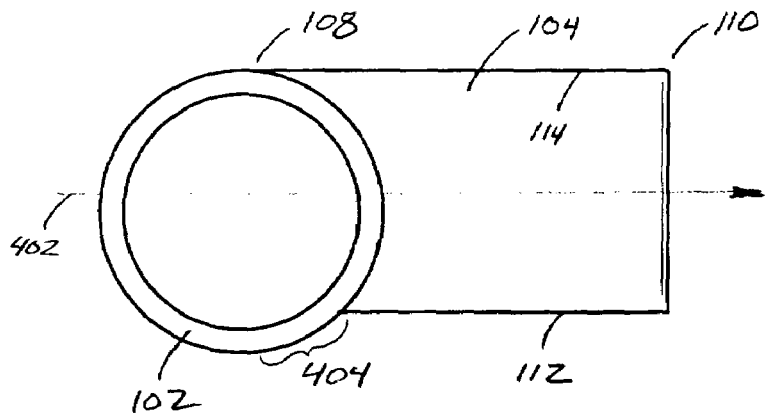
FIG. 4 is a top view of the hosel shown in FIG. 3.

A club head hosel in accordance with the present invention is formed using a slideable mold tool insert in conjunction with a mold tool having a cavity corresponding to an advantageously shaped hosel. That is, referring to FIGS. 3 and 4, a hosel 300 in accordance with the present invention generally comprises a cylindrical boss portion 102 coupled to a horizontal leg portion 104. Boss portion 102 is configured to accept a golf club shaft (not shown). Horizontal leg portion 104 extends outward radially from the base 108 of boss portion 102, then transitions at a bend (or "end") 110 to a vertical leg portion 106. While the outer diameter of boss portion 102 is greater than the width of horizontal leg portion 104, sides 112 and 114 of horizontal leg portion 104 are substantially parallel, thereby providing desirable visual cues to the golfer in address position.

Figure 5:
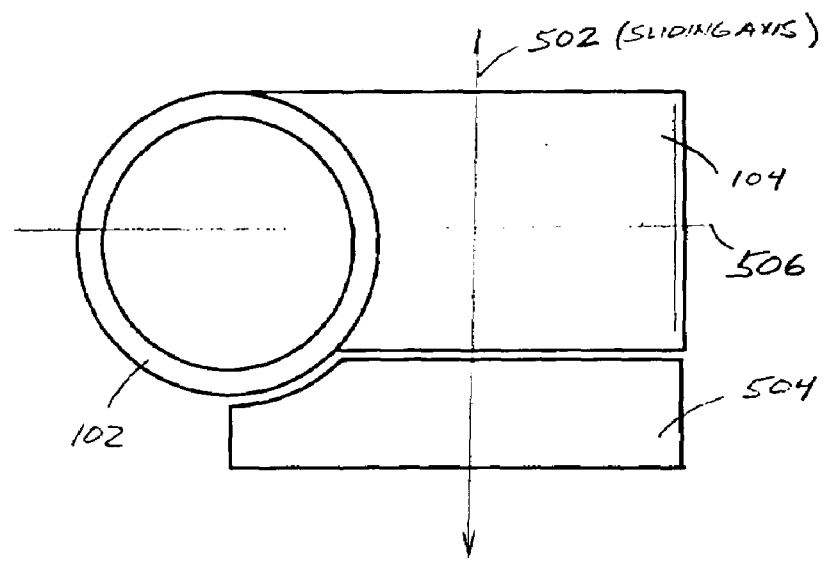
FIG. 5 is a top view of a hosel casting corresponding to the hosel of FIG. 3, including a slide-in mold tool insert.

With reference to the top-view shown in FIG. 5, a mold tool insert 504 is slideable coupled along a sliding axis 502 to a mold tool, i.e., a mold tool having a cavity corresponding to the outer dimensions of horizontal leg portion 104 and boss 102. Sliding axis 502 is substantially perpendicular to axis 506 of horizontal leg portion 104.

Figure 6:
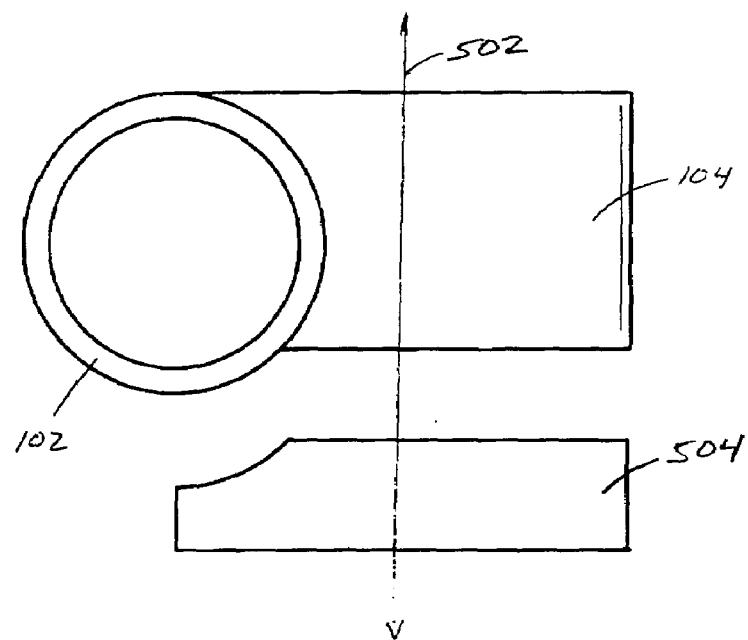
FIG. 6 depicts the repositioning of the mold tool insert shown in FIG. 5.

Mold tool insert 504 is configured to slide between two positions: a first position, as depicted schematically in FIG. 5, in which mold tool insert 504 comprises, within the mold cavity, a surface of boss portion 102 and a surface of horizontal leg portion 104; and a second position, as depicted schematically in FIG. 6, in which mold tool insert 504 disengages from the mold tool cavity, thus facilitating removal of the finished replica or mold.

Figure 7:
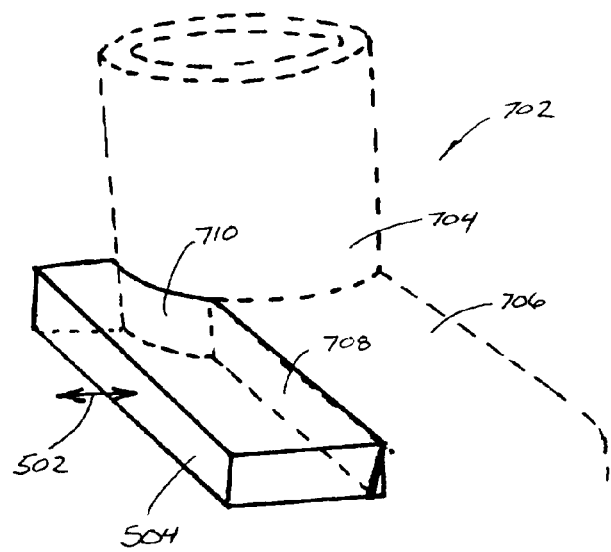
FIG. 7 is a perspective view of the mold tool insert with the golf club hosel shown in broken lines.

More particularly, as shown in FIG. 7, a mold tool is suitably fabricated with a cavity 702 comprising a first region 704 corresponding to the boss portion of the hosel, and a second region 706 corresponding to the horizontal leg portion of the hosel. Mold tool insert 504 is configured to slide along sliding axis 502 such that various surfaces of mold tool insert 504 form one or more of the inner walls of cavity 702. In accordance with the illustrated embodiment, mold tool insert 504 forms a surface 710 of boss region 704 and a surface 708 of horizontal leg portion 706.

Figure 8:
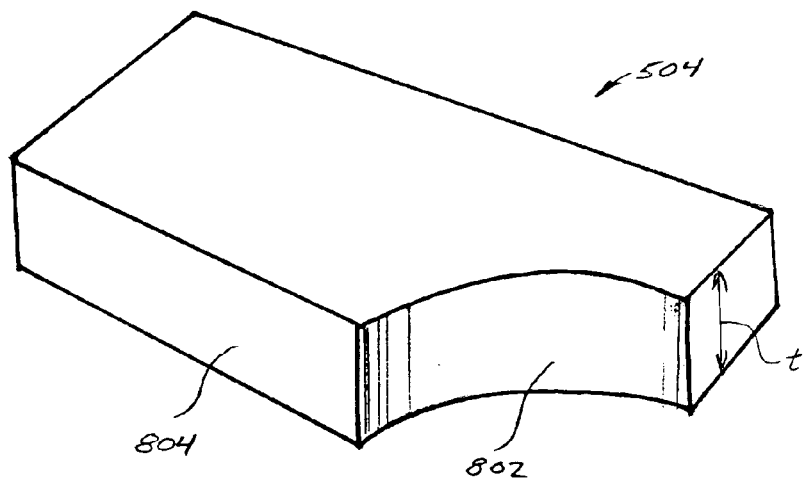
FIG. 8 is another perspective view of the mold tool insert.

Referring to FIGS. 7 and 8, an exemplary mold tool shape comprising a curved surface 802 (corresponding to region 710 of boss cavity 704), and a substantially planar surface 804 (corresponding to region 708 of horizontal leg cavity 706). In a preferred embodiment, to the extent that the outer surface of boss cavity 704 is cylindrical, surface 802 comprises a circular arc with a radius substantially equal to the radius of the desired hosel boss. The thickness of mold tool insert 504 may vary, but in a preferred embodiment is substantially equal to the thickness of horizontal leg cavity 706.

It will be understood that the exemplary mold insert 504 shown in FIG. 8 may be accompanied by additional hardware designed to facilitate its movement with respect to the mold cavity. For example, various screws, tracks, sliders, bearings, springs, and other such conventional components may be attached to or incorporated into mold tool insert 504 to achieve the objects of the present invention. In one embodiment, for example, mold tool insert 504 is coupled to the mold tool such that mold tool insert 504 automatically moves into a first position (as shown in FIGS. 5 and 7) when the mold tool is closed, then automatically moves into a second position (as shown in FIG. 6) when the mold tool is opened (i.e., after the hosel has been suitably formed). This may be accomplished by using a variety of known components such as spring-loaded pins and the like.

Furthermore, while mold tool insert 504 is shown as having generally rectilinear corners and edges, it will be appreciated that insert 504 may have any convenient rectilinear or curvilinear shape. Similarly, mold tool insert 504 may be manufactured using any suitable material, depending in part on the temperature of the mold and the composition of the material that is injected into the mold tool. In an exemplary embodiment, mold tool insert 504 comprises a rigid metallic material such as titanium or steel. Various ceramics, plastics, and/or composite materials may also be used.

The present invention may be employed in connection with a variety of molding processes. In a preferred embodiment, mold tool insert 504 is incorporated into an investment casting or "lost-wax" molding process wherein a wax replica of the club head and hosel is first produced. That is, a mold tool is provided that has a shape characterized in part by the hosel shape shown in FIG. 3. A suitable wax material is injected into the closed mold while the mold tool insert is in its first position—that is, in a position in which the mold tool insert forms part of the inner walls of the hosel boss cavity and horizontal leg cavity (as shown in FIG. 7). After the wax form has cooled to a suitable temperature, the mold tool is opened, thereby moving the mold tool insert to its second position where it is disengaged from the surface of the cooled wax form.

Because mold tool insert 504 disengages from the cavity as it moves to its second position, the finished wax form can be removed from the cavity without encountering the problems presented by prior art molding techniques, wherein the position of the separation line with respect to the boss and horizontal leg portion would prohibit easy removal of the finished replica.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A method of fabricating a golf club hosel comprising the steps of:
   providing a mold tool having a cavity corresponding to a hosel having a generally cylindrical boss portion coupled to a horizontal leg portion extending radially from said boss portion, said horizontal leg portion having a width that is less than an outside diameter of said boss portion;
   providing a mold tool insert slideably coupled to said mold tool along a sliding axis generally perpendicular to said horizontal leg portion;
   sliding said mold tool insert to a first position such that said mold tool insert forms, within said cavity, a surface of said boss portion and a surface of said horizontal leg portion;
   filling said mold tool cavity with a material; and
   sliding said mold tool insert to a second position such that said mold tool insert disengages from said material in said mold tool cavity.

2. The method of claim 1, wherein said mold tool has an open configuration and a closed configuration, and wherein said step of sliding said mold tool insert to a first position is performed automatically when said mold tool is placed in said closed configuration, and said step of sliding said mold tool insert to a second position is performed automatically when said mold tool is placed in said open configuration.

3. The method of claim 1, wherein said step of filling said mold tool comprises the step of injecting a wax.

4. The method of claim 1, wherein said mold tool insert comprises metal.

5. A mold tool for manufacturing a golf club hosel, said mold tool comprising:
   a cavity corresponding to a hosel having a generally cylindrical boss portion coupled to a horizontal leg portion extending radially from said boss portion, said horizontal leg portion having a width that is less than an outside diameter of said boss portion;
   a mold tool insert slideably coupled to said mold tool along a sliding axis generally perpendicular to said horizontal leg portion of said cavity;
   said mold tool insert having a first position wherein said mold tool insert forms, within said cavity, a surface of said cylindrical portion and a surface of said horizontal leg portion, and a second position wherein said mold tool insert is disengaged from said mold tool cavity.

6. The mold tool of claim 5, wherein the mold tool has an open configuration and a closed configuration, and wherein said mold tool insert is configured to automatically move to a first position when the mold tool is placed in said closed configuration, and wherein said mold tool insert is configured to automatically move to a second position when said mold tool is placed in said open configuration.

7. The mold tool of claim 5, wherein said mold tool insert comprises a metal.

* * * * *